United States Patent Office 2,829,978
Patented Apr. 8, 1958

2,829,978
PUDDING COMPOSITIONS AND METHOD OF MAKING A PUDDING

Mary P. Castagna, Brooklyn, N. Y., Dale S. Thomas, Ridgewood, N. J., Alfred D. Campbell, Noroton, Conn., and Robert J. Carbonell, New York, N. Y., assignors to Standard Brands Incorporated, New York, N. Y., a corporation of Delaware No Drawing. Application May 5, 1955
Serial No. 506,368
18 Claims. (Cl. 99—139)

This invention relates to pudding compositions and more particularly to compositions in the form of a dry powder which are capable of forming a pudding simply by mixing with milk or water and without cooking.

U. S. Patent 2,607,692 describes compositions of this type comprised of gelatinized pudding starch, sugar, a tetra-alkali-metal pyrophosphate, and an edible water-soluble calcium salt. These compositions require a relatively high level of starch and puddings prepared from them have a tendency to become very stiff upon storage for a few hours.

We have found that the pudding compositions described in this patent may be greatly improved by the addition of an edible water-soluble salt of orthophosphoric acid. Although orthophosphates when used alone have little gelling action on milk, when used with the pyrophosphate and the calcium salt they give a synergistic effect in that the gelling action of this three-salt combination is much greater than:

(a) The sum of the independent effects obtained from the same amounts of these salts when used singly;

(b) The gelling action obtained with the same amounts of any two of these salts when used at the same time (pyrophosphate and orthophosphate, pyrophosphate and calcium salt, or orthophosphate and calcium salt); and (c) The sum of the gelling action of orthophosphate and the gelling action of a mixture of pyrophosphate and calcium salt.

As a consequence the use of orthophosphate enables one to obtain the desired pudding consistency with the use of less gelatinized starch and/or pyrophosphates and/or calcium salts.

Furthermore by using the three gelling salts together puddings may be obtained which do not become objectionably stiff and pasty on storage but remain creamy and retain the desirable characteristics of freshly prepared puddings. Moreover, the use of the three gelling salts enables one to produce dry mixes with longer shelf life. In addition, with the three gelling salt combination one may vary either the amount of gelatinized starch or the amounts of the salts over a wide range and thus vary the character of the pudding to obtain products which are like cooked pudding, like chiffon dessert or even like custard dessert.

The dry pudding compositions of the present invention are comprised of sugar or other sweetening agent, an edible pyrophosphate, an edible calcium salt, an edible orthophosphate and an edible thickener. Flavoring and coloring ingredients may be and preferably are included. Other ingredients, for instance, cocoa or coconut particles may also be included if desired. Dried whole milk or dried non-fat milk may be included in the dry composition in which case puddings may be prepared therefrom by simply mixing with water instead of milk.

As a thickener we may use, for instance, gelatinized starch, algin, Irish moss and gums extracted from Irish moss. The pyrophosphate is preferably an alkali-metal pyrophosphate, for instance, tetrasodium pyrophosphate or tetrapotassium pyrophosphate. Suitable calcium salts are, for example, calcium acetate, calcium chloride, calcium propionate, calcium saccharate, calcium tartrate and monocalcium phosphate. The orthophosphates may be, for example, the salts of ammonium and the alkali-forming metals and in particular, $NaH_2PO_4$, $Na_2HPO_4$, $Na_3PO_4$, $KH_2PO_4$, $K_2HPO_4$, $K_3PO_4$, $(NH_4)H_2PO_4$, $(NH_4)_2HPO_4$ and $Ca(H_2PO_4)_2$.

To prepare the dry compositions the powdered ingredients are simply mixed together. To prepare a pudding the dry powder may be mixed with cold milk and the mixture beaten for a short time, as with the common hand egg beater or an electric beater. Most of the mixtures will set in a few minutes but some may take a longer time. Instead of milk we can use reconstituted dry-whole milk, reconstituted evaporated milk, undiluted evaporated milk or reconstituted non-fat dry milk solids.

The gelling salts may be used in a wide range of proportions although a small amount of each is sufficient. For instance, a package of pudding mix to be added to a pint of fresh whole milk may contain from a fraction of a gram to several grams of each gelling salt. For example, we may use from 0.9 to 4.0 grams of anhydrous tetrasodium pyrophosphate, from 0.1 to 4.0 grams of anhydrous disodium orthophosphate and 0.4 to 4.0 grams of calcium acetate. The other phosphate and calcium salts can be used on an approximately equivalent $P_2O_5$ and calcium basis, that is, 0.48 to 2.13 grams of $P_2O_5$ in the form of a pyrophosphate, 0.05 to 2.0 grams of $P_2O_5$ in the form of an orthophosphate and 0.10 to 1.0 gram of calcium. Each of these salts will show a maximum effect somewhere within the range specified for it depending upon the levels of the other salts. In practice the amount of the salts used would be limited by considerations of economy and taste. Most consumers would probably consider a pudding too salty, saline, or even slightly bitter if made from a mix containing 8–10 grams of salts per pint of milk.

The thickener may also be used in a wide range of proportions to give the desired consistency. The minimum is the amount necessary to prevent curdling of the milk, which in the case of starch is about 9 grams per pint of milk. Higher amounts of starch, and preferably from about 15 to about 25 grams per pint of milk, are desirable to give the best consistency.

The invention is illustrated by the following examples of dry pudding mixes suitable for addition to one pint of fresh whole milk. Amounts indicated are in grams. For the sake of brevity only the starch and gelling salts are specified, it being understood that in each case the pudding mix contained in addition, 80 grams of cane sugar, 2.0 grams of flavored corn sugar, 2.6 grams of colored corn sugar and 1.2 grams of table salt. The relative stiffness of set of the prepared puddings is given in viscometer units (VU) which are the readings obtained on a Brookfield viscometer using a 49 mm. spindle at 1 R. P. M. and helipath stand. Unless otherwise stated the puddings were prepared with fresh whole milk having a temperature of 10° C., stored at 10° C., and the tests were made 18 minutes after the puddings were prepared.

The synergistic effect obtained with an orthophosphate is shown in the following table, each sample being made up with 24 grams of gelatinized starch.

TABLE I

| Sample | $Na_4P_2O_7 \cdot 10H_2O$ | $Na_2HPO_4$ | $CaAc_2$ | Stiffness of set, VU |
|---|---|---|---|---|
| A | 2.616 | 1.108 | 1.2 | 280 |
| B | 2.616 | | 1.2 | 133 |
| C | 2.616 | | | 68 |
| D | 2.616 | 1.108 | | 145 |
| E | | 1.108 | 1.2 | 15 |
| F | | 1.108 | | 5 |
| G | | | 1.2 | 12 |

The following table compares a control pudding mix typical of the compositions disclosed in Patent 2,607,692 with pudding mixes formulated in accordance with the invention with an orthophosphate and amounts of starch and/or pyrophosphate and/or calcium salt below those used in the control.

TABLE II

| Example | Ingredient reduced | Starch | Na₄P₂O₇ | Na₂HPO₄ | Calcium acetate | VU |
|---|---|---|---|---|---|---|
| Control | | 24.00 | 2.00 | | 1.20 | 164 |
| 1 | Starch | 16.80 | 2.00 | 0.80 | 1.20 | 167 |
| 2 | Pyrophosphate | 24.00 | 1.40 | 0.40 | 1.20 | 164 |
| 3 | Calcium salt | 24.00 | 2.00 | 0.60 | 0.60 | 170 |
| 4 | Starch and pyrophosphate | 16.80 | 1.60 | 1.00 | 1.20 | 170 |
| 5 | Starch and calcium salt | 16.80 | 2.00 | 2.00 | 0.60 | 163 |
| 6 | Pyrophosphate and calcium salt | 24.00 | 1.20 | 0.75 | 0.60 | 175 |
| 7a | Starch, pyrophosphate and calcium salt | 16.80 | 1.40 | 2.40 | 0.80 | 165 |
| 7b | | 16.80 | 1.80 | 1.80 | 0.60 | 157 |

The following table gives additional compositions employing a reduced amount of starch.

TABLE III

| Example | Starch | Na₄P₂O₇ | Na₂HPO₄ | CaAc₂ |
|---|---|---|---|---|
| 8 | 16.80 | 1.60 | 1.50 | 1.40 |
| 9 | 12.00 | 1.60 | 0.10 | 1.20 |
| 10 | 12.00 | 1.60 | 1.20 | 1.20 |

Composition 7b (Table II) gave a slightly foamy pudding. The product obtained with composition 8 was smooth and heavy bodied like a cooked pudding whereas that obtained with composition 9 was foamy and chiffon-like and that obtained with composition 10 was smooth, thin-bodied and like a custard dessert.

The following examples illustrate the use of various orthophosphates.

TABLE IV

| Example | Orthophosphate | Starch | Na₄P₂O₇ | Orthophosphate | Calcium acetate | VU |
|---|---|---|---|---|---|---|
| 11 | NaH₂PO₄.H₂O | 16.80 | 2.0 | 1.2 | 1.2 | 165 |
| 12 | Na₃PO₄.12H₂O | 16.80 | 2.0 | 1.8 | 1.2 | 168 |
| 13 | KH₂PO₄ | 16.80 | 2.0 | 2.0 | 1.2 | 160 |
| 14 | K₂HPO₄ | 16.80 | 2.0 | 1.6 | 1.2 | 155 |
| 15 | K₃PO₄ | 16.80 | 2.0 | 0.8 | 1.2 | 150 |
| 16 | (NH₄)H₂PO₄ | 16.80 | 2.0 | 1.2 | 1.2 | 160 |
| 17 | (NH₄)₂HPO₄ | 16.80 | 2.0 | 2.0 | 1.2 | 168 |
| 18 | Ca(H₂PO₄)₂.H₂O | 16.80 | 2.0 | 1.0 | 1.2 | 165 |

The following examples illustrate the use of several calcium salts other than the acetate.

TABLE V

| Example | Use of— | Starch | Na₄P₂O₇ | Na₂HPO₄ | Ca salt | VU |
|---|---|---|---|---|---|---|
| 19 | CaCl₂.2H₂O | 16.80 | 2.0 | 0.80 | 0.70 | 176 |
| 20 | Ca tartrate | 16.80 | 2.0 | 0.80 | 2.40 | 153 |
| 21 | Ca citrate | 16.80 | 2.0 | 0.80 | 3.20 | 159 |

*Example 22*

To illustrate the use of tetrapotassium pyrophosphate, a dry mix was compounded of 16.8 grams of gelatinized starch, 2.8 grams of K₄P₂O₇.3H₂O, 0.8 gram of Na₂HPO₄ and 1.2 grams of calcium acetate. The viscometer reading of the pudding prepared therefrom was 150.

*Example 23*

To illustrate the use of a low level of starch, a dry mix was compounded of 9 grams of gelatinized starch, 1.2 grams of anhydrous tetrasodium pyrophosphate, 2 grams of anhydrous disodium orthophosphate and 1.2 grams of calcium acetate.

*Example 24*

A pudding mix containing dry milk solids was prepared by adding 46 grams of non-fat dry milk solids to the mix set forth in Example 7b above. The pudding prepared by adding this mix to one pint of cold water gave a viscometer reading of 118.

To show the improved shelf life of the formulations containing orthophosphate, dry mixes of the composition of the control and Example 7b in Table II were stored at 92° F. and 90% relative humidity and the stiffness of set of puddings made therefrom after storage was determined as follows:

| | Time of storage of dry mix | | | |
|---|---|---|---|---|
| | 0 weeks | 4 weeks | 6 weeks | 8 weeks |
| Control VU | 162 | 122 | 87 | 51 |
| Example 7b VU | 194 | 193 | 172 | 154 |

Puddings were prepared from mixes having the composition of the control and Example 7b of Table II and these puddings were stored at a temperature of 10° C. The stiffness of the set determined after certain intervals, is given below:

| | Time after pudding preparation | | | |
|---|---|---|---|---|
| | 1 hour | 4 hours | 17 hours | 24 hours |
| Control VU.[1] | 125 | 287 | 402 | 402 |
| Example 7b VU.[1] | 100 | 118 | 118 | 118 |

[1] Taken with a 37 mm. diameter spindle. These results should be multiplied by 2 to give approximately equivalent readings to those obtained with a 49 mm. spindle as used elsewhere in this application.

Whereas the control pudding increased in stiffness for 17 hours to give a very stiff product the other pudding attained maximum stiffness 4 hours after preparation and remained smooth and creamy thereafter.

The pudding made from the control (pudding I) was stored for 7 hours and the pudding made from the composition of Example 7b (pudding II) was stored for 24 hours, after which they were presented to a panel of 112 tasters who were requested to express their preference and comments. Eighty-eight tasters preferred pudding II, sixteen pudding I, and eight had no preference. A study of the comments of the tasters showed that thirty-two preferred pudding II because of better flavor, forty-eight because of better consistency and eight had miscellaneous comments such as that pudding I was pasty, starchy, heavy, stiff, dry, thick or granular.

Since certain changes may be made in the above process and composition which embody the invention without departing from its spirit or scope it is intended that all matter contained in the above description shall be interpreted as illustrative and not in a limiting sense. It is also to be understood that the following claims are intended to cover all of the generic and specific features of the invention herein described.

We claim:
1. A dry composition for producing a pudding by interaction with milk comprising a sweetening agent, an edible thickener in an amount sufficient to prevent curdling of the milk, an edible pyrophosphate, an edible orthophosphate and an edible calcium salt the amounts of the pyrophosphate, orthophosphate and calcium salt being sufficient to gel the milk to a pudding consistency.

2. A composition as claimed in claim 1 containing in addition dry milk solids.

3. A composition as claimed in claim 1 wherein the thickener is gelatinized starch.

4. A dry composition for producing a pudding by interaction with milk comprising sugar, gelatinized starch in an amount sufficient to prevent curdling of the milk, an edible tetra-alkali metal pyrophosphate, an edible water-soluble orthophosphate of the group consisting of orthophosphates of ammonium and the alkali-forming metals, and an edible water-soluble calcium salt the amounts of the pyrophosphate, orthophosphate and calcium salt being sufficient to gel the milk to a pudding consistency.

5. A dry composition for producing a pudding by admixture with milk comprising the following ingredients per pint of milk: 0.48 to 2.13 grams of $P_2O_5$ in the form of an edible alkali-metal pyrophosphate; 0.05 to 2.0 grams of $P_2O_5$ in the form of an edible water-soluble orthophosphate; 0.10 to 1.0 gram of Ca in the form of an edible water-soluble calcium salt, and from 9 to 25 grams of gelatinized starch.

6. A composition as claimed in claim 5 wherein the orthophosphite is an alkali metal orthophosphate.

7. A composition as claimed in claim 6 wherein the orthophosphate is a sodium orthophosphate.

8. A composition as claimed in claim 7 wherein the orthophosphate is disodium orthophosphate.

9. A composition as claimed in claim 5 wherein the orthophosphate is an ammonium orthophosphate.

10. A composition as claimed in claim 5 wherein the orthophosphate is monocalcium orthophosphate.

11. A composition as claimed in claim 5 comprised of tetrasodium pyrophosphate, disodium orthophosphate and calcium acetate.

12. A method of preparing a pudding which comprises mixing with milk small amounts of an edible pyrophosphate, an edible orthophosphate and an edible calcium salt, and sufficient edible thickener to prevent curdling of the milk, the amounts of the salts being such as to gel the mixture so that it will not pour.

13. A method of preparing a pudding which comprises mixing with milk small amounts of an edible tetra-alkali metal pyrophosphate, an edible water-soluble orthophosphate, and an edible water-soluble calcium salt, and sufficient gelatinized starch to prevent curdling of the milk, the amounts of the salts being such that the mixture is gelled and will not pour.

14. A method as claimed in claim 13 wherein the salts used are tetrasodium pyrophosphate, disodium orthophosphate and calcium acetate.

15. A pudding prepared as described in claim 12.

16. A pudding prepared as described in claim 13.

17. A pudding prepared as described in claim 14.

18. A dry composition for producing a pudding by admixture with milk comprising the following ingredients per pint of milk: 0.48 to 2.13 grams of $P_2O_5$ in the form of an edible alkali-metal pyrophosphate; 0.05 to 2.0 grams of $P_2O_5$ in the form of an edible water-soluble orthophosphate; 0.10 to 1.0 gram of Ca in the form of an edible water-soluble calcium salt, and an edible thickener in an amount sufficient to prevent curdling of the milk.

References Cited in the file of this patent
UNITED STATES PATENTS

| | | |
|---|---|---|
| 2,588,419 | Sevall et al. | Mar. 11, 1952 |
| 2,607,692 | Kennedy et al. | Aug. 19, 1952 |